(12) United States Patent
Chun et al.

(10) Patent No.: US 8,774,125 B2
(45) Date of Patent: Jul. 8, 2014

(54) METHOD OF MANAGING DATA BLOCKS DURING HANDOVER

(75) Inventors: Sung Duck Chun, Anyang-si (KR); Young Dae Lee, Anyang-si (KR); Sung JUn Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 699 days.

(21) Appl. No.: 12/531,232

(22) PCT Filed: Mar. 14, 2008

(86) PCT No.: PCT/KR2008/001463
§ 371 (c)(1),
(2), (4) Date: Sep. 14, 2009

(87) PCT Pub. No.: WO2008/111820
PCT Pub. Date: Sep. 18, 2008

(65) Prior Publication Data
US 2010/0046472 A1    Feb. 25, 2010

Related U.S. Application Data

(60) Provisional application No. 60/895,117, filed on Mar. 15, 2007.

(30) Foreign Application Priority Data

Mar. 14, 2008  (KR) .......................... 10-2008-0023806

(51) Int. Cl.
*H04W 4/00*       (2009.01)
*H04W 36/02*   (2009.01)
(52) U.S. Cl.
CPC ..................................... *H04W 36/02* (2013.01)
USPC ......................................................... 370/331

(58) Field of Classification Search
CPC ...................................................... H04W 36/02
USPC ......................................................... 370/331
See application file for complete search history.

(56) References Cited

U.S. PATENT DOCUMENTS 5,563,920 A    10/1996  Fimoff et al.
6,032,197 A    2/2000   Birdwell et al.
(Continued)

FOREIGN PATENT DOCUMENTS

KR    10-2005-0089692    9/2005
KR    1020050089692      9/2005
(Continued)

OTHER PUBLICATIONS

NEC, "Persistent Scheduling and Dynamic Allocation," 3GPP TSG-RAN WG2 #55, R2-062788, Oct. 2006, XP-050132317.

(Continued)

*Primary Examiner* — Asad Nawaz
*Assistant Examiner* — Saad A Waqas
(74) *Attorney, Agent, or Firm* — Lee, Hong, Degerman, Kang & Waimey

(57) ABSTRACT

A method of enabling a source base station (BS) to manage an uplink data block during handover from the source BS to a target BS in a wireless communication system is provided. The method includes informing the target BS of a sequence number of a uplink data block to be received from a user equipment (UE) and receiving from the target BS the uplink data block corresponding to the sequence number. Data is properly shared by a source base station (BS) and a target BS during handover. Thus, processing capacity of the target BS can be reduced and overhead on network interface can also be reduced.

4 Claims, 7 Drawing Sheets

(56) References Cited

U.S. PATENT DOCUMENTS

| | | | |
|---|---|---|---|
| 6,882,637 | B1 | 4/2005 | Le et al. |
| 7,656,902 | B2 | 2/2010 | Yi et al. |
| 7,782,818 | B2 * | 8/2010 | Hurtta et al. ............... 370/331 |
| 2002/0145990 | A1 * | 10/2002 | Sayeedi ..................... 370/335 |
| 2003/0157921 | A1 * | 8/2003 | Kekki et al. ................. 455/403 |
| 2004/0125817 | A1 | 7/2004 | Miyazaki et al. |
| 2006/0221993 | A1 * | 10/2006 | Liao et al. .................. 370/449 |
| 2006/0274694 | A1 * | 12/2006 | Rajkumar et al. ........... 370/331 |
| 2007/0155388 | A1 * | 7/2007 | Petrovic et al. ............. 455/442 |
| 2007/0224993 | A1 * | 9/2007 | Forsberg .................... 455/436 |
| 2007/0293226 | A1 * | 12/2007 | Lee et al. .................... 455/436 |
| 2007/0293254 | A1 * | 12/2007 | Jiang .......................... 455/466 |
| 2008/0070578 | A1 * | 3/2008 | Flore et al. .................. 455/438 |
| 2009/0124259 | A1 * | 5/2009 | Attar et al. .................. 455/436 |
| 2009/0274107 | A1 | 11/2009 | Park et al. |

FOREIGN PATENT DOCUMENTS

| | | | | |
|---|---|---|---|---|
| KR | 10-2007-0016208 | | 2/2007 | |
| WO | 02-056561 | | 7/2002 | |
| WO | WO 2005074308 | A1 * | 8/2005 | ............... H04Q 7/22 |
| WO | 2006041269 | | 4/2006 | |
| WO | 2006-075042 | | 7/2006 | |
| WO | 2006075042 | | 7/2006 | |
| WO | 2007/024099 | | 3/2007 | |

OTHER PUBLICATIONS

Ericsson, "Semi Persistent Scheduling," 3GPP TSG-RAN WG2 Meeting #55, R2-062859, Oct. 2006, XP-002496512.

Rapporteur (Motorola), "Report of E-Mail Discussion: DL Scheduling," 3GPP TSG-RAN WG2, R2-063684, Dec. 2006, XP-050133082.

Freelance Semiconductor et al., "DL Scheduling," 3GPP TSG RAN WG2 #57, R2-070968, Feb. 2007.

Korean Intellectual Property Office Application Serial No. 10-2007-0037954, Notice of Allowance dated Jan. 27, 2014, 2 pages.

Korean Intellectual Property Office Application Serial No. 10-2008-0023920, Office Action dated Mar. 7, 2014, 4 pages.

* cited by examiner

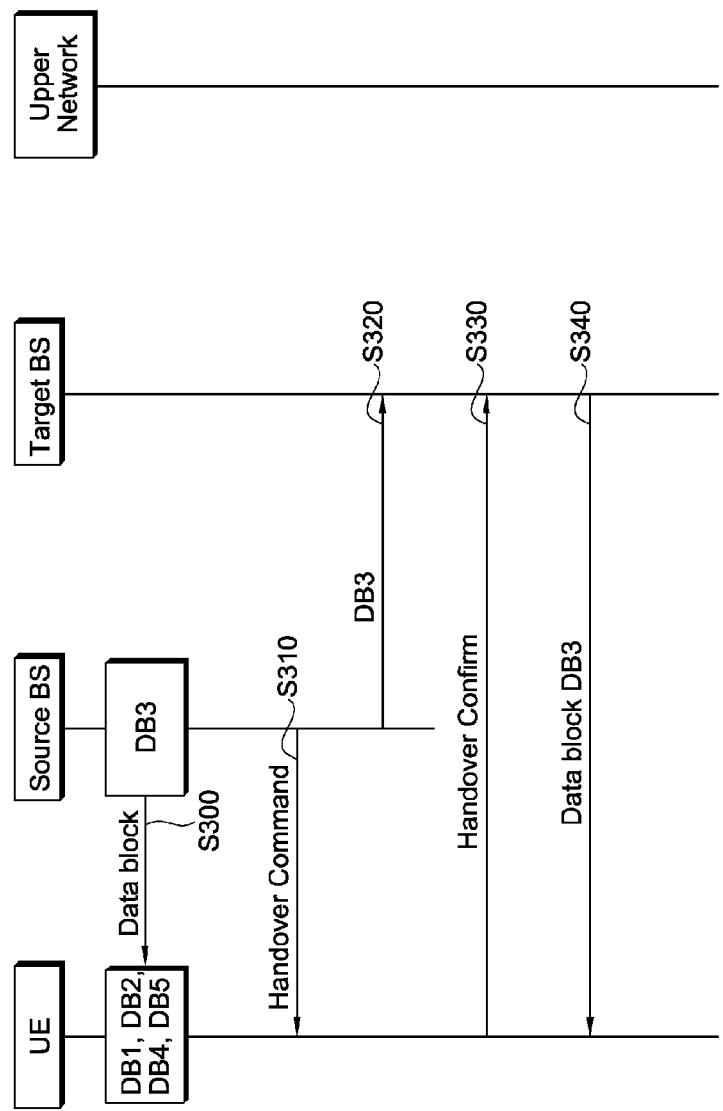

METHOD OF MANAGING DATA BLOCKS DURING HANDOVER

CROSS-REFERENCE TO RELATED APPLICATIONS

This application is a national stage application of International Application No. PCT/KR2008/001463, filed on Mar. 14, 2008, which claims the benefit of earlier filing date and right of priority to Korean Application No. 10-2008-0023806, filed on Mar. 14, 2008, and also claims the benefit of U.S. Provisional Application Ser. No. 60/895,117, filed on Mar. 15, 2007.

TECHNICAL FIELD

The present invention relates to wireless communications, and more particularly, to a method of managing data blocks during a handover procedure in a wireless communication system.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with radio access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment (UE), and the like are defined as requirements.

A wireless communication system is different from a wired communication system in that seamless services have to be provided to a UE having mobility. That is, the wireless communication system has to support the UE which moves from one cell to another cell. When the UE is moving away from a previous base station (BS), to which the UE is currently connected, while approaching a new BS, there is a need to perform a process of changing an access point of the UE to the new BS over a network. The previous BS is referred to as a source BS. The new BS is referred to as a target BS. The process of changing the access point from the source BS to the target BS is referred to as handover. In general, in the handover, data cannot be transmitted to and received from the UE after the UE is disconnected from the source BS until the UE is connected to the target BS.

All user data has a time limit. For example, in the case of voice call, one piece of voice information has to be transmitted to a recipient within a predetermined time period. In addition, packet data (e.g., transmission control protocol/Internet protocol (TCP/IP) packet) has to be delivered from a caller to the recipient within the predetermined time period, and the recipient has to transmit an acknowledgement to the caller.

A UE and a BS continuously exchange acknowledgment information for transmitted and received data. If a single TCP/IP packet is lost in transmission by subordinate entities, a data transfer rate decreases sharply. For example, when the single TCP/IP packet is lost while data is transmitted and received at a data transfer rate of 100 Mbit/s, the data transfer rate may abruptly decrease, for example, to 10 Kbit/s. Therefore, in order to reduce influence of packet loss which may occur in the transmission of the TCP/IP packet, the wireless communication system uses a lossless mode. The lossless mode can be provided by acknowledged mode (AM) radio link control (RLC) layer. When an acknowledgement response is not received within a predetermined time period after data is transmitted or when non-acknowledgement information is received, an AM RLC entity of a transmitter retransmits the data. The transmitter does not always retransmit the data. Rather, the transmitter retransmits the data upon receiving the acknowledgment response within a predetermined maximum transmission delay time.

FIG. 1 is a flow diagram showing a handover procedure.

Referring to FIG. 1, a UE transmits data blocks to a source BS to which the UE is currently connected (step S10). The UE transmits five data blocks DB1 to DB5 in a data block unit. The source BS fails in receiving the third data block DB3. Thus, four data blocks DB1, DB2, DB4, and DB5 are stored in a buffer. When a predetermined requirement is satisfied, the source BS transmits to the UE a handover command message that instructs handover (step S11).

Thereafter, among the data blocks received by the source BS from the UE, the source BS delivers to an upper network the consecutively received data blocks DB1 and DB2 (step S12). Further, the source BS delivers the remaining data blocks DB4 and DB5 to a target BS (step S13).

The UE requests the target BS to perform synchronization (step S14). The target BS delivers timing information and uplink allocation information to the UE (step S15). The UE sends a handover confirm message to the target BS (step S16). The target BS sends acknowledgement information to the UE (step S17). The acknowledgement information indicates whether a specific data block is successfully or unsuccessfully received by the target BS from the source BS. The UE transmits to the target BS the data block DB3 that is not successfully received by the source BS (step S18). The target BS sends to the upper network the received data block DB3 together with the data blocks DB4 and DB5 previously received from the source BS (step S19).

When data is successfully received by the source BS but is not consecutively received, the source BS delivers the data to the target BS. The data is eventually transmitted to the upper network. However, the data transmission from the source BS to the target BS results in increase in processing capacity of the target BS and also increase in wired network traffic.

DISCLOSURE OF INVENTION

Technical Problem

A method is sought for reducing processing capacity of a base station during handover.

Technical Solution

In an aspect, a method of enabling a source base station (BS) to manage an uplink data block during handover from the source BS to a target BS in a wireless communication system is provided. The method includes informing the target BS of a sequence number of a uplink data block to be received from a user equipment (UE) and receiving from the target BS the uplink data block corresponding to the sequence number.

In another aspect, a method of enabling a target base station (BS) to manage an uplink data block during handover from a source BS to the target BS in a wireless communication system is provided. The method includes receiving a sequence number of an uplink data block from the source BS, receiving the uplink data block corresponding to the sequence number from a user equipment (UE) and transmitting to the source BS the uplink data block corresponding to the sequence number.

In still another aspect, a method of enabling a user equipment (UE) to manage an uplink data block during handover from a source base station (BS) to a target BS in a wireless communication system is provided. The method includes receiving a handover command message from the source BS, transmitting a handover confirm message to the target BS, receiving acknowledgement information regarding a sequence number of an uplink data block that is not successfully received by the source BS and transmitting the uplink data block to the target BS.

Advantageous Effects

Data is properly shared by a source base station (BS) and a target BS during handover. Thus, processing capacity of the target BS can be reduced and overhead on network interface can also be reduced.

BRIEF DESCRIPTION OF THE DRAWINGS

FIG. 8 is a flow diagram showing a method of managing data blocks according to an embodiment of the present invention.

MODE FOR THE INVENTION

Figure 1:
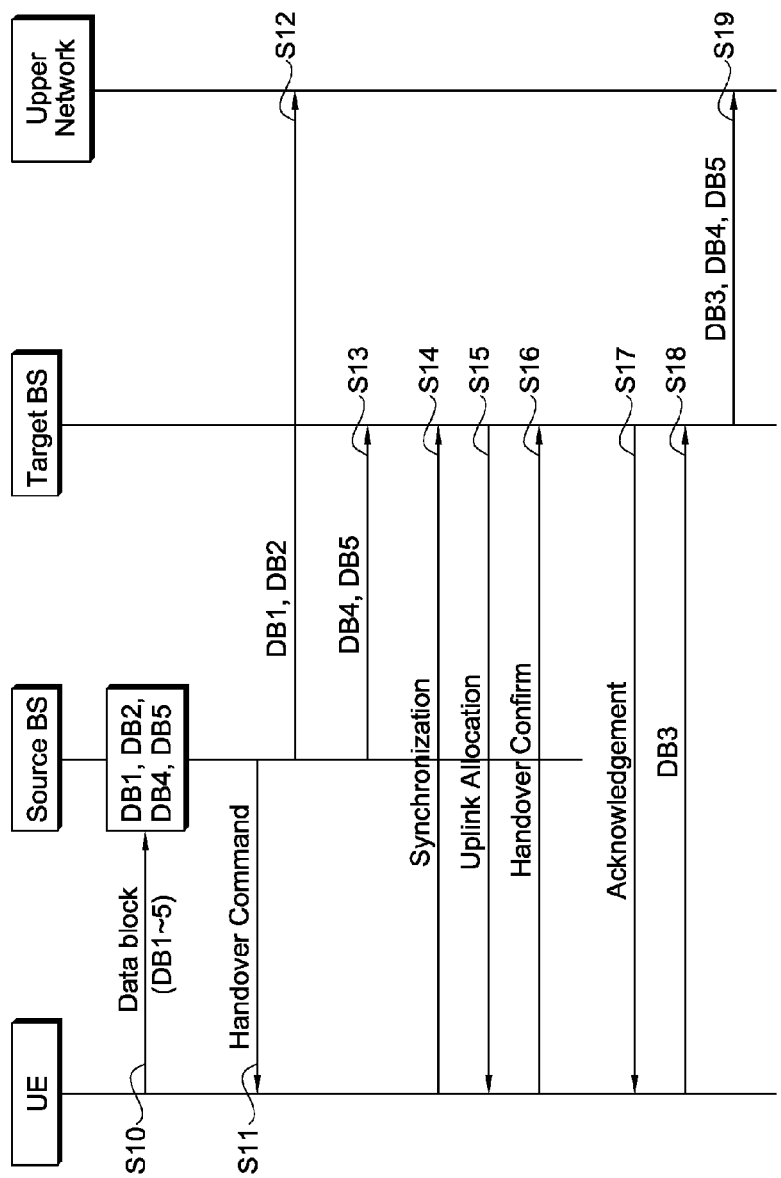
FIG. 1 is a flow diagram showing a handover procedure.
Figure 2:
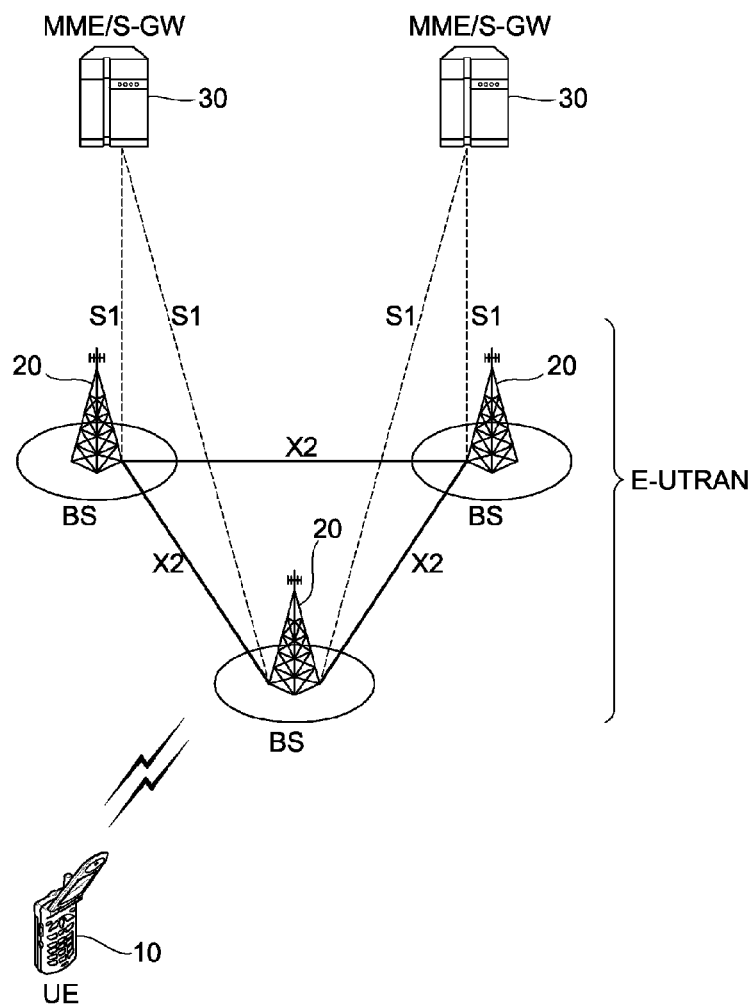
FIG. 2 shows a structure of a wireless communication system.

FIG. 2 shows a structure of a wireless communication system. The wireless communication system may have a network structure of an evolved-universal mobile telecommunications system (E-UMTS). The E-UMTS may be referred to as a long-term evolution (LTE) system. The wireless communication system can be widely deployed to provide a variety of communication services, such as voices, packet data, etc.

Referring to FIG. 2, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, downlink is defined as a communication from the BS 20 to the UE 10, and uplink is defined as a communication from the UE 10 to the BS 20.

The BSs 20 are interconnected with each other by means of an X2 interface. The BSs 20 are connected by means of an S1 interface to an evolved packet core (EPC), more specifically, to a mobility management entity (MME)/service gateway (S-GW) 30. The S1 interface supports a many-to-many relation between the BS 20 and the MME/S-GW 30.

Figure 3:
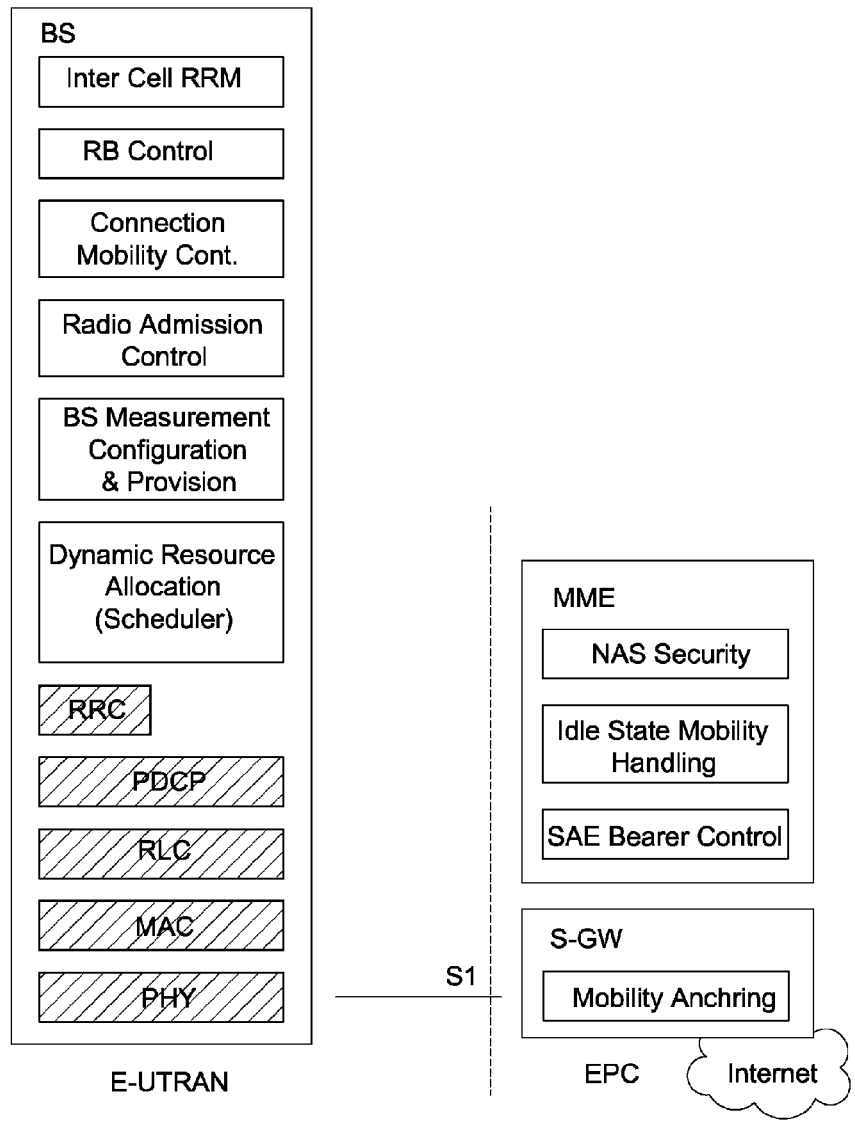
FIG. 3 is a block diagram showing functional split between an evolved-universal mobile telecommunications system terrestrial radio access network (E-UTRAN) and an evolved packet core (EPC).

FIG. 3 is a block diagram showing functional split between an E-UTRAN and an EPC.

Referring to FIG. 3, slashed boxes indicate radio protocol layers and white boxes indicate functional entities of a control plane.

A BS performs the following functions: (1) functions for radio resource management (RRM) such as radio bearer control, radio admission control, connection mobility control, and dynamic allocation of resources to UEs; (2) Internet protocol (IP) header compression and encryption of user data streams; (3) routing of user plane data to an S-GW; (4) scheduling and transmission of paging messages; (5) scheduling and transmission of broadcast information; and (6) measurement and measurement reporting configuration for mobility and scheduling.

An MME performs the following functions: (1) distribution of paging messages to BSs; (2) security control; (3) idle state mobility control; (4) system architecture evolution (SAE) bearer control; and (5) ciphering and integrity protection of non-access stratum (NAS) signaling.

An S-GW performs the following functions: (1) termination of a user plane packet for paging; and (2) user plane switching for the support of UE mobility.

Figure 4:
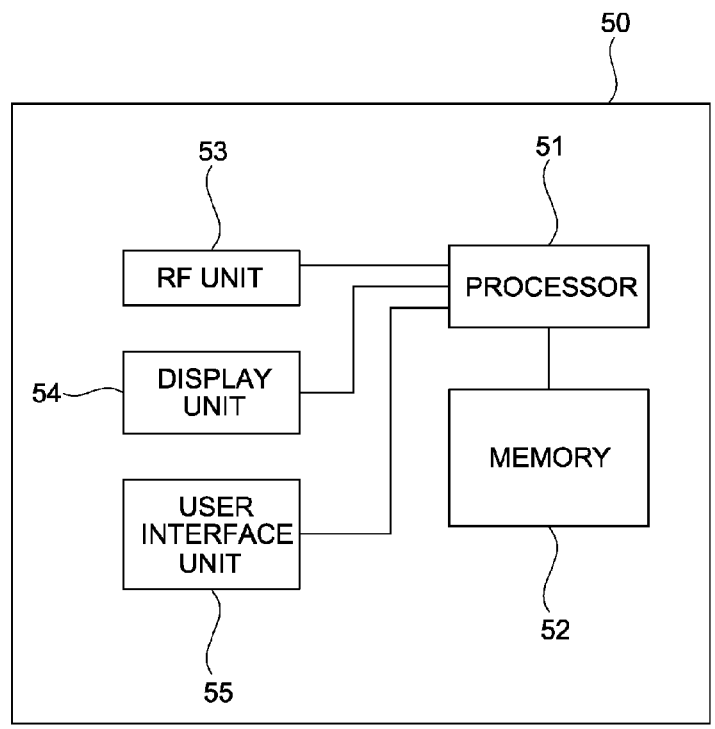
FIG. 4 is a block diagram showing constitutional elements of a user equipment (UE).

FIG. 4 is a block diagram showing constitutional elements of a UE. A UE 50 includes a processor 51, a memory 52, a radio frequency (RF) unit 53, a display unit 54, and a user interface unit 55. Layers of a radio interface protocol are implemented in the processor 51. The processor 51 provides a control plane and a user plane. The function of each layer can be implemented in the processor 51. The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between a UE and a network can be classified into L1 layer (a first layer), L2 layer (a second layer), and L3 layer (a third layer) based on the lower three layers of the open system interconnection (OSI) model that is well-known in a communication system. A physical layer, or simply a PHY layer, belongs to the first layer and provides an information transfer service on a physical channel. A radio resource control (RRC) layer belongs to the third layer and serves to control radio resources between the UE and the network. The UE and the network exchange RRC messages via the RRC layer.

Figure 5:
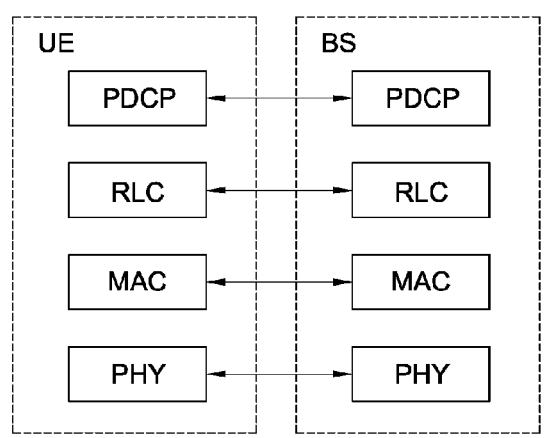
FIG. 5 is a block diagram showing a radio protocol architecture for a user plane.
Figure 6:
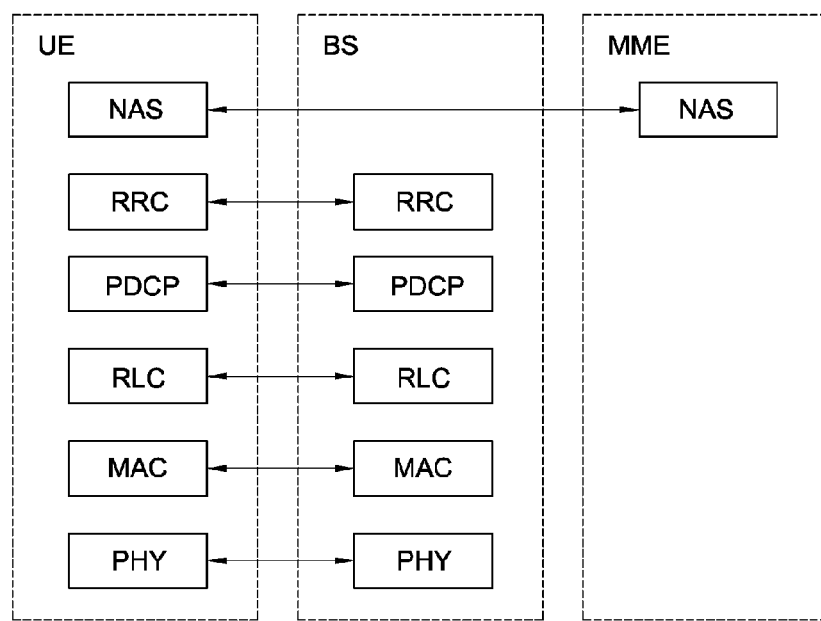
FIG. 6 is a block diagram showing a radio protocol architecture for a control plane.

FIG. 5 is a block diagram showing a radio protocol architecture for a user plane. FIG. 6 is a block diagram showing a radio protocol architecture for a control plane. They illustrate the architecture of a radio interface protocol between a UE and an E-UTRAN. The user plane is a protocol stack for user data transmission. The control plane is a protocol stack for control signal transmission.

Referring to FIGS. 5 and 6, a PHY layer belongs to a first layer and provides an upper layer with an information transfer service on a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data are transferred through the physical channel. The PHY layer can be modulated by orthogonal frequency division multiplexing (OFDM). Time and/or frequency can be utilized as radio resources.

The MAC layer belongs to a second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. An AM RLC provides bidirectional data transmission services and supports re-transmission when the transfer of a RLC protocol data unit (PDU) fails.

A packet data convergence protocol (PDCP) layer belongs to the second layer and performs a header compression function. When transmitting an IP packet such as an IPv4 packet or an IPv6 packet, a header of the IP packet may contain relatively large and unnecessary control information. The PDCP layer reduces a header size of the IP packet so as to efficiently transmit the IP packet.

A radio resource control (RRC) layer belongs to a third layer and is defined only in the control plane. The RRC layer serves to control the logical channel, the transport channel, and the physical channel in association with configuration, reconfiguration and release of radio bearers (RBs). An RB is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management and mobility management.

A downlink transport channel is a channel through which data is transmitted from the network to the UE. Examples of the downlink transport channel include a broadcast channel (BCH) for transmitting system information and a downlink-shared channel (DL-SCH) for transmitting user traffic or control messages. User traffic of downlink multicast or broadcast service or control messages can be transmitted on the DL-SCH or a downlink multicast channel (MCH). An uplink transport channel is a channel through which data is transmitted from the UE to the network. Examples of the uplink transport channel include a random access channel (RACH) for transmitting initial control messages and an uplink-shared channel (UL-SCH) for transmitting user traffic or control messages.

A downlink physical channel is mapped to the downlink transport channel. Examples of the downlink physical channel include a physical broadcast channel (PBCH) for transmitting information of the BCH, a physical multicast channel (PMCH) for transmitting information of the MCH, a physical downlink shared channel (PDSCH) for transmitting information of the PCH and the DL-SCH, and a physical downlink control channel (PDCCH) for transmitting control information such as downlink or downlink scheduling grant, which are provided from the first layer and the second layer. The PDCCH is also referred to as a downlink L1/L2 control channel. An uplink physical channel is mapped to the uplink transport channel. Examples of the uplink physical channel include a physical uplink shared channel (PUSCH) for transmitting information of the UL-SCH, a physical random access channel (PRACH) for transmitting information of the RACH, and a physical uplink control channel (PUCCH) for transmitting control information such as hybrid automatic repeat request (HARQ) acknowledgement (ACK)/non-acknowledgement (NACK) signals, a scheduling request signal, and a channel quality indicator (CQI), which are provided from the first layer and the second layer.

Figure 7:
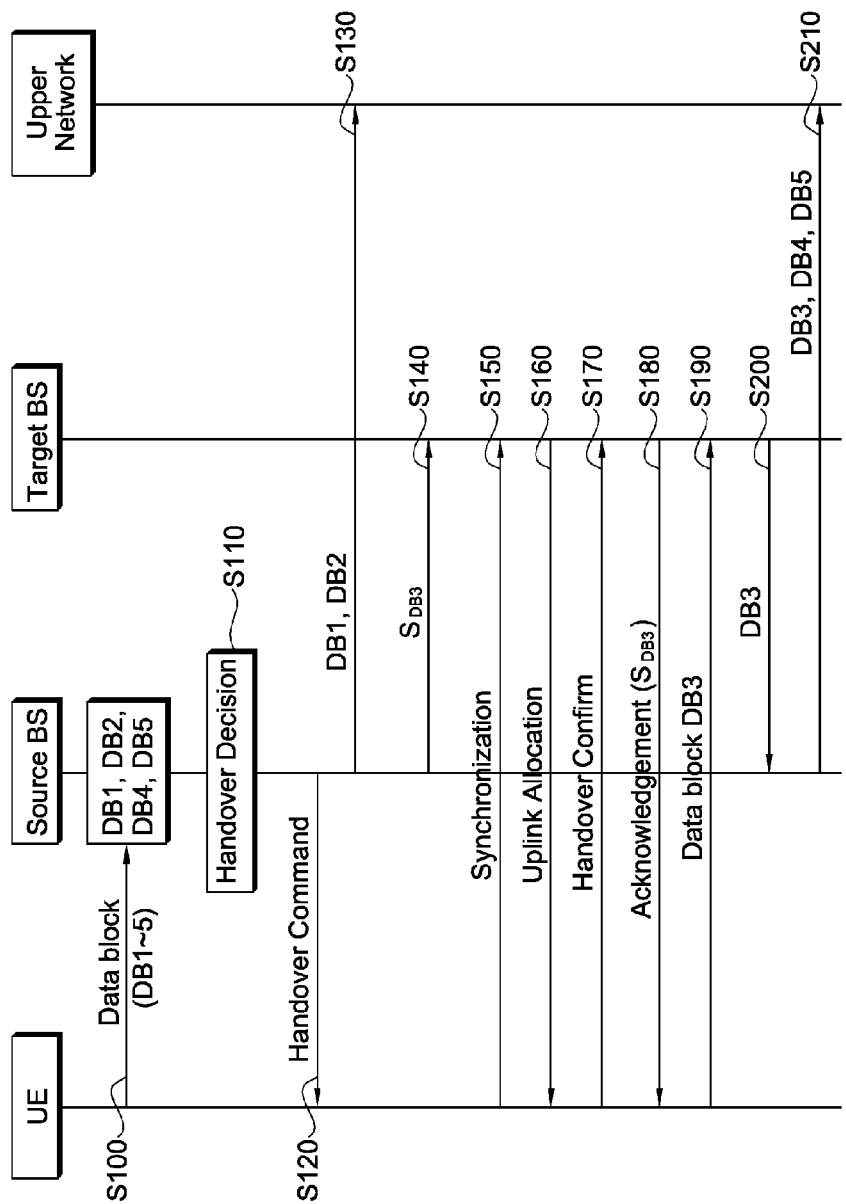
FIG. 7 is a flow diagram showing a method of managing data blocks during a handover procedure according to an embodiment of the present invention.

FIG. 7 is a flow diagram showing a method of managing data blocks during a handover procedure according to an embodiment of the present invention. A source BS represents a BS to which a UE is connected before a handover starts. A target BS represents a BS to which the UE is connected after the handover ends. An upper network manages UE mobility and may be an MME/S-GW.

Referring to FIG. 7, a UE transmits data blocks to a source BS to which the UE is currently connected (step S100). The UE transmits five data blocks DB1 to DB5 in a data block unit. The source BS fails in receiving the third data block DB3. Thus, four data blocks DB1, DB2, DB4, and DB5 are stored in a buffer. The five data blocks are a set of data blocks belonging to a window for managing the data blocks in a specific layer. The layer may be a PDCP layer, and in this case, the data blocks are PDCP PDUs.

The source BS receives a measurement report from the UE, and then determines whether to perform a handover to the target BS (step S110). According to a handover decision, the source BS transmits to the UE a handover command message that instructs the handover (step S120).

Thereafter, among the data blocks received by the source BS from the UE, the source BS delivers to the upper network the data blocks DB1 and DB2 which are consecutively received (step S130).

The source BS delivers to the target BS a sequence number SDB3 of the data block DB3 that is not successfully received by the source BS among the data blocks within the window (step S140). Instead of delivering the received data blocks to the target BS, the source BS informs the target BS a sequence number of a data block to be delivered.

The source BS delivers the sequence number $S_{DB3}$ of the data block DB3 to the target BS in order to report a data block (e.g., the DB3) that is not successfully received by the source BS among the data blocks within the window. Such information may be informed in various manners. For example, the source BS may inform the target BS of a sequence number (e.g., $S_{DB2}$) of a last data block among the consecutively received data blocks. For another example, the source BS may inform the target BS of a sequence number (e.g., $S_{DB2}$) of a data block having a highest sequence number among the consecutively received data blocks. For another example, the source BS may inform the target BS of sequence numbers (e.g., $S_{DB1}$, $S_{DB2}$, $S_{DB4}$, and $S_{DB5}$) of data blocks which are included in the window and are received by the source BS. For another example, the source BS may inform the target BS of a sequence number (e.g., $S_{DB3}$) of a data block that is not successfully received by the source BS, wherein the sequence number is selected from among sequence numbers in the range between a sequence number (e.g., $S_{DB2}$) of a last data block among the consecutively received data blocks and a sequence number (e.g., $S_{DB5}$) of a data block having a highest sequence number. For another example, the source BS may inform the target BS of a sequence number (e.g., $S_{DB2}$) of a last data block among the data blocks delivered to the upper network by the source BS. For another example, the source BS may inform the target BS of a sequence number (e.g., $S_{DB2}$) of a data block having a highest sequence number among the data blocks delivered to the upper network by the source BS. For another example, the source BS may inform the target BS sequence numbers (e.g., $S_{DB1}$, $S_{DB2}$, $S_{DB4}$, and $S_{DB5}$) of the data blocks delivered to the upper network by the source BS. For another example, the source BS may inform the target BS of a sequence number (e.g., $S_{DB3}$) of a data block that is not successfully received by the source BS, wherein the sequence number is selected from among sequence numbers in the range between a sequence number (e.g., $S_{DB2}$) of a last data block among the data blocks delivered to the upper network by the source BS and a highest sequence number (e.g., $S_{DB5}$) of data blocks which are not transmitted to the upper network by the source BS and are stored in the buffer.

The UE requests the target BS to perform synchronization (step S150). This step can be performed by transmitting a random access preamble from the UE to the target BS. The random access preamble may be a dedicated random access preamble previously assigned by the target BS. The dedicated random access preamble may be transmitted from the source BS to the UE by using a handover command message.

The target BS delivers timing information and uplink allocation information to the UE (step S160). The timing information and the uplink allocation information may be transmitted by using a random access response message which is a response for the random access preamble.

The UE transmits a handover confirm message to the target BS (step S170). The handover confirm message may be transmitted by using the uplink allocation information.

The target BS transmits acknowledgement information to the UE (step S180). The acknowledgement information includes the sequence number $S_{DB3}$ of the data block DB3 that is not successfully received by the source BS among the data blocks within the window. The acknowledgement information also includes a sequence number of a data block whose reception is requested by the source BS to the target BS. In transmission, the acknowledgement information may be included in a response message for the handover confirm message.

Although it has been described above that the target BS informs the UE of the sequence number $S_{DB3}$ of the data block DB3, the present invention is not limited thereto. Thus, according to another embodiment of the present invention, the source BS may use the handover command message or the like to directly inform the UE of the sequence number $S_{DB3}$ of the data block DB3 that is not successfully received by the source BS.

The UE transmits to the target BS the data block DB3 that is not successfully received by the source BS (step S190). The UE may transmit the retransmitted data block DB3 after ciphering the data block by using a security configuration parameter used in the source BS. This is because the target BS transmits the retransmitted data block DB3 to the source BS without processing the data block DB3. This means that, as for a data block that is originally intended to be transmitted by the UE to the source BS, the UE can transmit the data block to the target BS after ciphering the data block by using the security configuration parameter determined by the source BS. Alternatively, the UE may transmit the retransmitted data block DB3 after de-ciphering the data block by using the security configuration parameter determined by the source BS and ciphering the data block by using a security configuration parameter determined by the target BS. The UE may transmit the retransmitted data block by including an indicator which indicates whether the retransmitted data block is ciphered by using the security configuration parameter determined by the source BS or the security configuration parameter determined by the target BS.

The target BS transmits the received data block DB3 to the source BS (step S200). That is, as for a data block that is originally intended to be transmitted by the UE to the source BS, the target BS delivers the data block to the source BS without processing the data block.

The source BS rearranges the data blocks DB4 and DB5 stored in the buffer and the data block DB3 received from the target BS, and transmits the rearranged data blocks to the upper network when the rearrangement is successful (step S210).

According to data management defined between the source BS and the target BS in the handover procedure, unnecessary traffic can be avoided, and system efficiency can increase.

FIG. 8 is a flow diagram showing a method of managing data blocks according to an embodiment of the present invention. The method of FIG. 8 is for a downlink data block.

Referring to FIG. 8, a source BS transmits downlink data blocks to a UE (step S300). It is assumed herein that the source BS transmits five data blocks DB1 to DB5 in a data block unit, but fails in the transmission of the data block DB3. Thus, the data block DB3 is stored in a buffer.

According to a handover decision, the source BS transmits a handover command message to the UE (step S310).

Thereafter, the source BS delivers to a target BS the data block DB3 that is not successfully delivered (step S320). The source BS transmits the data block DB3 to the target BS after ciphering the data block by using a security configuration parameter determined by the source BS.

The UE transmits a handover confirm message to the target BS (step S330).

The target BS transmits to the UE the data block DB3 received from the source BS without processing the data block (step S340). That is, as for a data block that is originally intended to be transmitted by the source BS, the target BS transmits the data block in the same format as it is received, that is, the data block is ciphered by using the security configuration parameter determined by the source BS.

The target BS receives acknowledgement information from the UE. Thereafter, as for a data block that is not successfully received by the UE, the target BS transmits the data block in the same format as it is received, that is, the data block is ciphered by using the security configuration parameter determined by the source BS.

The target BS informs the UE of a highest sequence number among sequence numbers of the data blocks that are originally intended to be transmitted by the source BS. If a data block has a sequence number higher than the highest sequence number, the UE uses a security configuration parameter of the target BS. If a data block has a sequence number lower than the highest sequence number, the UE uses a security configuration parameter of the source BS. In a rearrangement process, the UE can determine which security configuration parameter will be used according to the sequence number. That is, the UE can determine to which data block a security configuration parameter used in the source BS (i.e., a conventional security configuration parameter) will be used and to which data block a security configuration parameter used in the target BS (i.e., a new security configuration parameter) will be used.

Alternatively, the target BS may inform the UE of a sequence number of a first data block to which the security configuration parameter of the target BS is applied. As for a data block having a sequence number equal to or higher than the sequence number of the first data block, the UE may apply the security configuration parameter of the target BS. As for a data block having a sequence number lower than the sequence number of the first block, the UE may apply the security configuration parameter of the source BS.

The source BS may inform the target BS of information regarding a data block on which the source BS performs ciphering and information regarding a data block on which the source BS dose not perform ciphering. Herein, the information may be a sequence number or the like.

By using the handover command message, the source BS can inform the UE of information regarding a data block on which the source BS performs ciphering and information regarding a data block on which the source BS does not perform ciphering. Herein, the information may be a sequence number or the like. According to the information, the UE can determine which security configuration parameter will be used for the data block, on which the source BS performs ciphering, when de-ciphering is performed.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of enabling a source base station (BS) to manage uplink data blocks during handover from the source BS to a target BS in a wireless communication system, the method comprising:
receiving a plurality of uplink data blocks from a user equipment (UE) currently connected to the source BS;
transmitting a handover command message to the UE;
informing the target BS of a sequence number of uplink data blocks that are not successfully received at the source BS from the UE;
informing the UE of the sequence number of uplink data blocks that are not successfully received at the source BS from the UE, in order for the UE to transmit uplink data blocks to the target BS including the uplink data blocks that are not successfully received at the source BS;
receiving from the target BS uplink data blocks, wherein a sequence number of the uplink data blocks received from the target BS is smaller than a highest sequence number that has been previously received at the source BS; and
reordering the plurality of uplink data blocks received from the UE with the uplink data blocks received from the target BS.

2. The method of claim 1, wherein the uplink data blocks received from the target BS are ciphered by using a security configuration parameter configured by the source BS.

3. The method of claim 1, wherein the plurality of uplink data blocks are packet data convergence protocol (PDCP) protocol data units (PDUs).

4. The method of claim 1, further comprising:
storing the plurality of uplink data blocks and the uplink data blocks received from the target BS in a buffer.

* * * * *